Oct. 3, 1967   L. GRANSTEN   3,344,797
FLUID MOTOR REGULATING MECHANISM HAVING FRICTION COMPENSATOR
Filed May 10, 1965

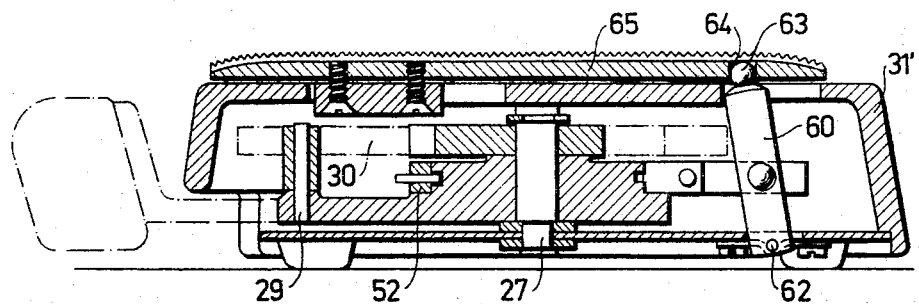
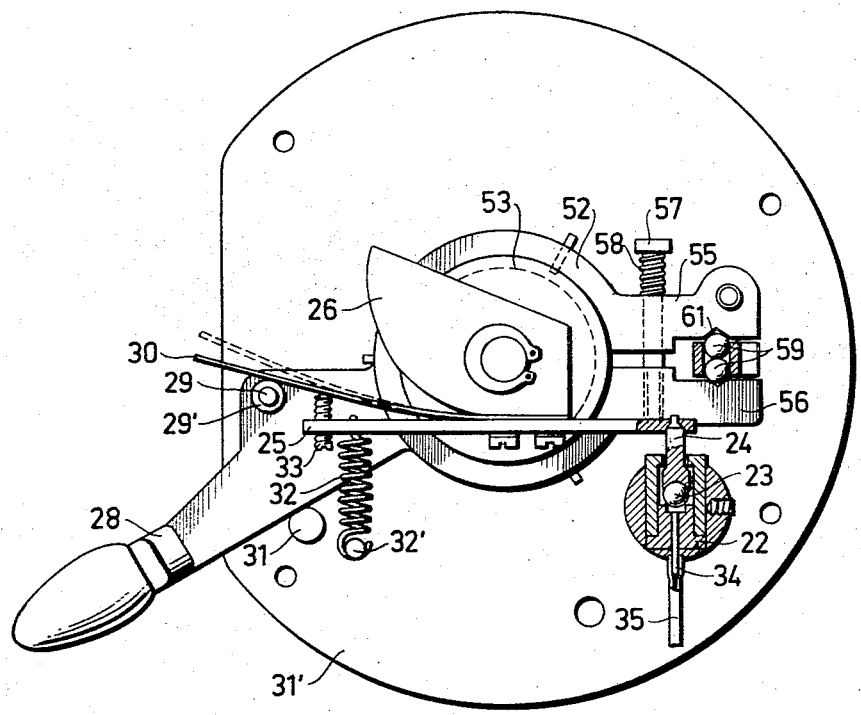

INVENTOR.
LENNART GRANSTEN
BY Irwin S. Thompson
ATTY.

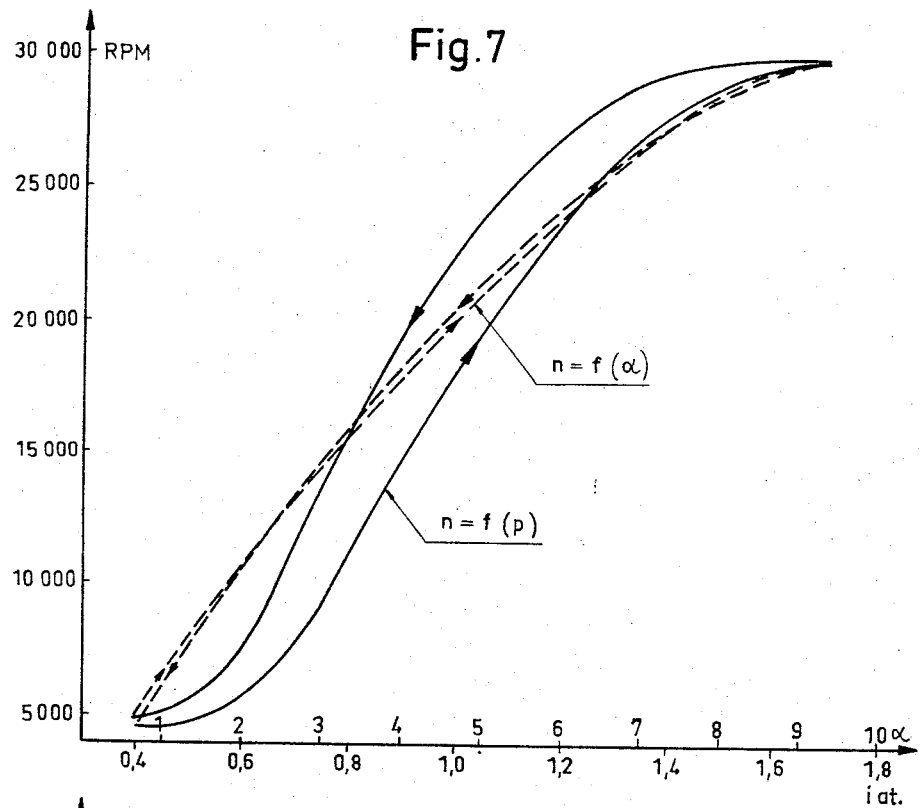
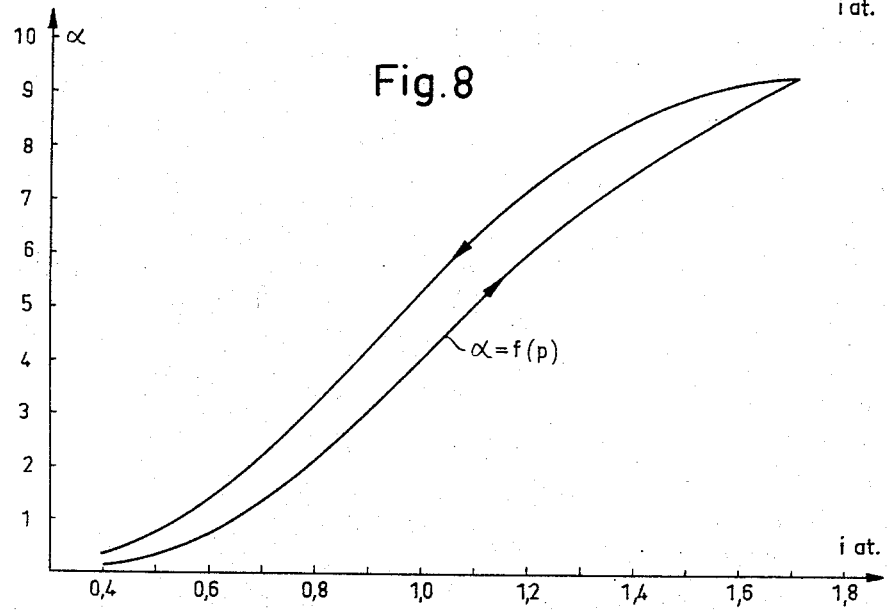

United States Patent Office 3,344,797
Patented Oct. 3, 1967

3,344,797
FLUID MOTOR REGULATING MECHANISM HAVING FRICTION COMPENSATOR
Lennart Gransten, Lannersta, Sweden, assignor to Rederi Ab Soya, a corporation of Sweden
Filed May 10, 1965, Ser. No. 454,592
8 Claims. (Cl. 137—18)

The present invention relates to mechanisms for regulating motors driven by a gaseous or fluid pressure medium in which the mechanism comprises a control device and regulating means to be actuated by the control device.

In regulating mechanisms of the type in view the regulating movement is dependent upon the pressure of the pressure medium and on a friction which in one direction of the regulating movement counteracts the pressure causing the regulating movement and in the other direction of movement cooperates with said pressure. The regulating means may consist of, e.g. a piston or a slide valve which is displaced or turned in one direction of regulation by means of the pressure from the pressure medium regulated by the control device and is moved in the opposite direction with the aid of a spring loaded during the movement in the first direction. The friction between the regulating means and a surrounding casing which is inevitable, due to the sealing necessary for the pressure medium, then counteracts the regulating force produced by the pressure medium at increase of the pressure, so that the pressure has to overcome not only the counterforce from the spring but also the friction. During an opposite regulating movement the regulating force is the difference between the force of the spring and the friction power which corresponds to a lower pressure of the pressure medium than on corresponding conditions at regulation in the first direction. This involves a certain hysteresis in the control function and mechanism.

The primary object of the present invention is to provide a motor regulating mechanism in which the aforesaid hysteresis is reduced to a minimum or entirely eliminated.

A further object of the invention is to provide simple means for compensation of the hysteresis in view, such means including a friction coupling combined with the control device in such a manner as to counteract the effect of the said friction.

A still further object is to provide a regulating mechanism for hydraulic or pneumatic motors which is easily operable and has an accurate function.

Figure 1:
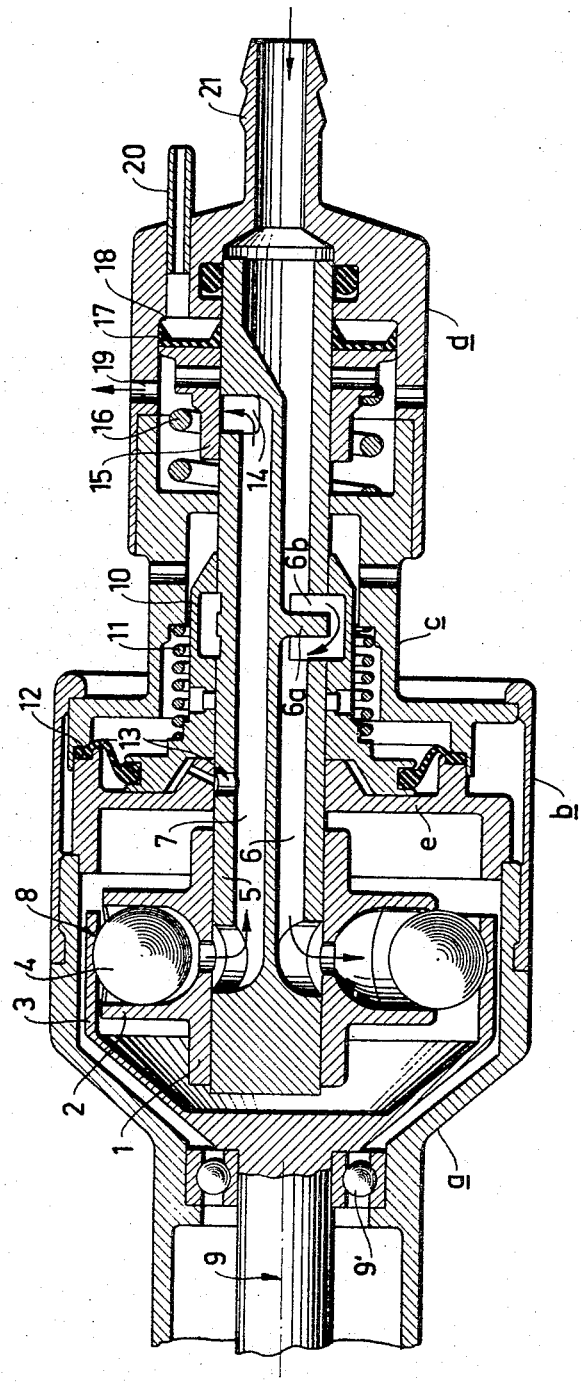
Figure 4:
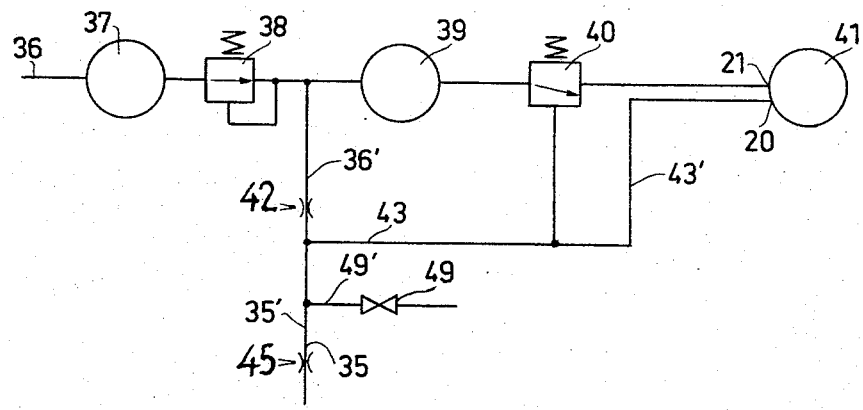
Figure 5:
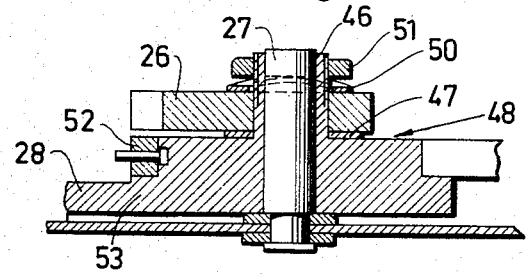
Figure 6:
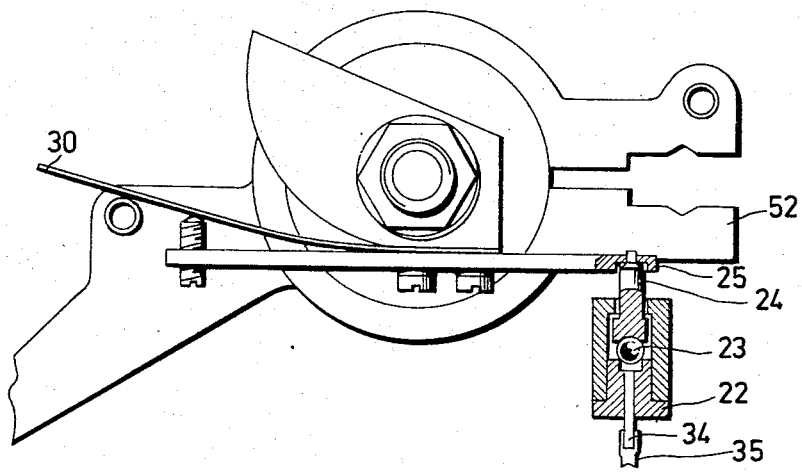

With the above and other objects in view the invention includes features elucidated by the following description of an embodiment of the invention as illustrated in the accompanying drawings by way of example and relating to a mechanism for dentists' purposes. In the drawings: FIG. 1 shows a longitudinal section of a motor operated with compressed air with a speed regulator and a means for the speed adjustment. FIG. 2 is an axial section of a control device constructed as a pedal control cooperating with and actuating the regulating device of the air motor. FIG. 3 is a top plan view of the control device shown in FIG. 2 the casing being removed. FIG. 4 is a wiring diagram of the regulating device and the motor with appurtenant connections. FIG. 5 is a cross section of a detail of a somewhat modified type of the control device. FIG. 6 illustrates the same device as FIG. 5 but in a top plan view partly in section of a valve. FIG. 7 is a graph on the speed of the motor as a function of the regulating pressure and the deflection of the control device with and without compensation according to the invention. FIG. 8 is a graph on the deflection of the control device as a function of the regulating pressure.

The compressed air operated motor as shown in the drawing has a casing consisting of four parts, $a$, $b$, $c$, and $d$. Part $a$ has a narrower, cylindric portion which via a cone shaped portion is enlarged to a cylindric portion of greater diameter. This portion is screwed together with casing part $b$, into which a radial wall of part $c$ is mounted. Part $c$ in turn is screwed together with part $d$. In the casing part $a$ there is provided a rotor 1 surrounded by a rotor ring 3. The rotor is equipped with cylinders 2, in which balls are working as pistons 4. The rotor 1 is rotatably journalled at the cantilever end of a stationary slide shaft or pintle 5 which is equipped with an inlet channel 6 and an outlet channel 7. The pistons 4 engage in the recesses 8 at the inside of the rotor ring 3. The rotor ring 3 is driven by the rotor with the aid of the pistons 4 which act as drivers and simultaneously allow a certain peripheral reciprocating movement between rotor and rotor ring. The outward and inward movement of the pistons 4 in the cylinders is caused by the pintle 5 being mounted eccentrically of the shaft 9 of the rotor ring 3. This shaft is journalled in ball bearings 9′ in the narrower cylindric section of casing part $a$. As indicated with arrows, compressed air enters through the inlet channel 6 into the cylinder directed downwards on FIG. 1 into rotor 1, so that the piston in this cylinder executes a working stroke, while air is exhausted from the upper cylinder the piston of which executes a return stroke, blowing off air through outlet 7.

The motor is provided with a speed regulator consisting of a slide valve 10 that is journalled on the pintle 5, and for one thing exposed to the force from a spring 11 and for another to the force from a diaphragm 12, onto which the pressure at the outlet end 7 of the motor is acting via an aperture 13 in the pintle 5. The diaphragm 12 is fastened at its periphery between casing part $c$ and an inner casing part $e$ which extends within part $b$ between parts $a$ and $c$, and moreover, inwardly towards the pintle, which it supports. Through the combined effect of radial partition 6$a$ of the pintle and an aperture 6$b$ extending along both sides of that partition the slide valve 10 can open and close the passage to the inlet channel 6 of the motor. The motor is so dimensioned that the quantity of air exhausted at the outlet end is proportional to the number of revolutions of the rotor. In the connection between the outlet channel 7 and the atmosphere there is an adjustable restriction which is formed by an aperture 14 in the pintle and a slide valve 15 surrounding the latter, the valve being assembled with a piston 17. This piston is a ring piston and sealed both towards the slide shaft 5 and the cylindric space 18 in casing part $d$, into which the slide valve is fitted. The cylindric space 18 is in connection with the atmosphere via a number of apertures 19. The exhaust air from the restriction can escape freely through the apertures 19. In the aperture 14 the slide valve 15 causes a pressure drop which is proportional to the quantity of exhausted air, and, hence, also to the number of revolutions of the rotor. The slide valve 15, normally closed by means of spring 16, is opened by admission of compressed air to piston 17 assembled with said slide valve. A connection member 20 provides for the admission of regulating pressure to the cylindric space 18 at one side of piston 17. A central connection 21 serves for the supply of driving air to the inlet channel 6 of the motor.

Briefly, the speed regulator works as follows: Unless the driving air is at overpressure, the slide valve 10 is completely open. At admission of compressed air the pistons 4 at the inlet end 6 are pressed outwards. Thereby, a torque is exerted in known fashion on the rotor ring 3, which as a consequence, starts to rotate. When the pistons come to the outlet end 7, the air from the cylinders is exhausted through the outlet channel. The motor is so dimensioned that the air exhausted from the cylinders substantially is expanded. Thus, the quantity of exhausted air is a measure of the number of revolutions and proportional to the number of revolutions. At exhaust of air through aperture 14 at the rear end of the pintle throttled by the regulating slide valve 15 a pressure drop arises which approximately proportionally reproduces the quantity of air exhausted per unit of time and, thus, also the number of revolutions. After the motor has accelerated to a certain number of revolutions and a certain pressure has been reached at the outlet end, this pressure which is transmitted through the aperture 13 may move the diaphragm 12 and the slide valve 10 in the closing direction so that an adjustment for a number of revolutions is set corresponding to the position at which the regulating slide valve has been set. When the motor is under load, the number of revolutions and the pressure at the outlet end will decrease. The slide valve 10 is then moved in the direction of opening, so that the number of revolutions will increase. The slide valve 10 is opening until a corresponding balance of the new load condition has been reached. At relief, the regulating operation will be in the reverse order.

For regulation of the pressure on the regulating piston 17 there is a control device, which in the drawing is shown as a pedal control, but may be hand-operated as well. The pedal control shown in FIGS. 2 and 3 has a throttle valve consisting of a seat 22 and a body in the form of a ball 23. A tappet 24 is adapted to press the ball with an adjustable force against the seat. The tappet 24 is actuated by an arm 25 mounted together with and screwed onto the curve surface of cam 26. The cam 26 is journalled on stationary shaft 27, on which also pedal 28 is journalled. This pedal 28 carries an abutment in the form of a pin 29 and a roll 29' journalled on that pin, the roll engaging on leaf spring 30, which is mounted on cam 26 at the same place as arm 25. The leaf spring 30 cooperates so with cam 26 that a suitably adapted force in dependence upon the angular motion of the pedal is transmitted to the movable parts of the valve. The leaf spring 30 provides for the return movement of the pedal as far as to stop 31 on the casing 31' of the pedal control. A tension return spring 32 is strained between arm 25 and pin 32' mounted on casing 31', so that the arm 25 is reset and the valve reliably opened when the pedal 28 rests against the stop 31. An adjustment screw 33 screwed into arm 25 is adjustable so that it deflects the leaf spring more or less whereby the movement of the lever-shaped pedal from stop 31 during the first portion of its movement in the closing direction of the valve is without effect, until the valve ball 23 is pressed against the seat 22. Thereby, the advantage is obtained that at a certain turning angle of the pedal 28 the torque onto the arm 25 is suddenly increased to a suitably adapted value. Therefrom results also a sudden rise of pressure at inlet 34 of the valve, which is connected to a regulating pipe 35, the sudden rise being desirable with a joint action of the pedal control and the regulating slide valve 15 of the motor. It is, furthermore, desirable for the joint action of the pedal control with an automatic stop valve that opens and closes the compressed air admission at the inlet of the motor. From the graph shown in FIG. 4 it is evident how the pedal control can be connected to the motor.

In FIG. 4 numeral 36 designates a supply pipe for compressed air, 37 a filter, 38 a reducing valve, 39 an oil mist lubricator, 40 an automatic opening and closing slide valve, and 41 the motor. The air flows successively from the supply pipe 36 through the mentioned devices to the inlet 21 of motor 41. Between the reducing valve 38 and the oil mist lubricator 39 there is a branch pipe 36' leading to throttle valve 42. From there pipe 43 leads to the automatic opening and closing valve 40. The pipe 43 is in connection with the regulating connection 20 of the motor 41 also via a pipe 43'. A continuation 35' of the branch pipe 36' is connected to the connection 35 of the throttle valve shown in FIG. 3, said connection being included in the pedal control 45. A branch pipe 49' leading to a stop valve 49 is branched from the pipe 35' in advance of the connection 35.

The regulation with the aid of the shown arrangements is effected in the following way.

At operation of the pedal control 45 through turning the lever or pedal 28 in a direction away from the stop 31, i.e. in clock-wise direction as per FIG. 3, a force dependent on the angular position of pedal 28 acts upon the valve ball 23 via the tappet 24. Therefrom a pressure corresponding to this position also results in the regulating pipes 35', 43, 43'. The throttle valve, suitably equipped with an adjusting screw, is constructed so that any small quantity of air desired may flow therethrough, and further through throttle valve 22, 23 of the pedal control into the atmosphere. When the pedal 28 has been turned so far that the pressure prevailing in pipe 35' has risen to, e.g. 0.4 kg./cm.$^2$, the automatic valve 40 is fully opened so that full driving pressure is supplied to the motor inlet 21. The regulating slide valve 15 of the motor is constructed so that it opens when the regulating pressure exceeds 0.4 kg./cm.$^2$. At this regulating pressure, the motor runs at a minimum number of revolutions since the outlet 7 then is completely closed. If the regulating pressure is increased through turning the pedal 28 further, the regulating slide valve 15 opens, so that the number of revolutions of the motor rises until its outlet pressure has reached a value at which it again exerts a force on the diaphragm 12, this force balancing the force of the spring 11 and setting the flow area of the slide valve 10 to a size that corresponds to the load conditions and the regulating value set, i.e. the air quantity being ejected at the outlet end. At increase of the regulating pressure to, e.g. 1.7 kg./cm.$^2$ the regulating slide valve is entirely open. This corresponds to a final position of the pedal control and, consequently, also to the maximum number of revolutions of the motor.

Thus, it is possible to continuously adjust the idle motion speed of the motor with the aid of the pedal control. At a given adjustment the speed regulator tends to keep the number of revolutions constant while the load is varying.

If, in the arrangement described, the speed of the motor is measured as a function of the regulating pressure, it will turn out that at an adjustment from below upwards a higher pressure will be required for a determined number of revolutions on account of the friction of the regulating piston 17 than necessary at adjustment from above downwards. This attitude is evident from FIG. 7, where below the abscissa the regulating pressure $p$ is indicated in atmospheres and on the ordinate the number of revolutions of the motor per minute. At rising regulating pressure the number of revolutions is increased according to the lowermost curve drawn in full line, whereas it desends at pressure fall as per the upper full line curve. The curves $n=f(p)$ show that the process is affected with a material hysteresis. Since it is not possible to avoid friction due to the required sealing of the regulating piston, the pedal 28 has consequently to have entirely different positions for one and the same number of revolutions, and that is depending upon the regulation being made downwards or upwards. The pedal control has unambiguous relation between regulating pressure and the turning angle. However, on the whole the hysteresis can be removed entirely with the arrangement of a suitable friction coupling which at increased turning angle provides greater load on the vlave, and vice versa. In other words, the friction of the regulating piston can be compensated by such a friction coupling.

From FIGS. 5 and 6 it can be seen how the friction coupling can be arranged.

FIGS. 5 and 6 show a portion of the pedal control according to FIGS. 2 and 3 with the difference that cam 26 in FIGS. 5 and 6 is journalled on a cylindric part 46 which is attached to pedal 28, the latter being journalled on shaft 27 as is the case in the example previously described. A friction disk 47 is provided between the cam 26 and the plane surface 48 of the pedal 28. A spring 50, the spring force of which is adjustable by means of a nut 51, urges the cam 26 against the disk 47 and the plane surface 48 of pedal 28. The friction between cam 26 and pedal 28 may, thus, be altered by changing the elastic force. The friction force, thus, cooperates with the elastic force of the leaf spring 30 at an increased turning angle, while at decreased turning angle it counteracts the elastic force. By suitably balancing the friction force between pedal 28 and cam 26, thus, the hysteresis of the regulating slide 15 may be compensated as desired.

The regulating pressure $p$ is indicated on the abscissa of the graph of FIG. 8, and the turning angle $\alpha$ of the pedal control on the ordinate. Also the curve shown here, $\alpha = f(p)$, has a material hysteresis. From FIG. 7 it can be seen how conditions change at providing a friction coupling, possibly of the type shown in FIGS. 5 and 6, the dotted curve indicating the number of revolutions as a function of the pedal deflection, i.e. $n = f(\alpha)$. In FIG. 7 the angle $\alpha$ has been inserted above the abscissa. The dotted curve shows that the hysteresis at regulation upwards and downwards has been reduced to a fraction of its previous size. In other words, from FIG. 7 it follows that there is a practically unambiguous ratio between the number of revolutions $n$ and the turning angle $\alpha$ of the pedal.

Through suitable choice of the shape of the cam 26 combined with an expedient characteristic line for spring 30, the curve $p = f(\alpha)$ will have a course that occasions a considerable approach to a linearity of the function $n = f(p)$.

A special advantage of the approach to linearity in combination with the removal of the hysteresis effect makes it possible to take advantage of the described arrangement for presetting of the number of revolutions. Since, as mentioned, the function $n = f(\alpha)$ is unambiguous, a given turning angle $\alpha$ of the pedal corresponds always to a given number of revolutions. An arrangement for presetting the number of revolutions is shown in FIGS. 2, 3, 5 and 6 in the form of a friction ring 52 which is able to span a corresponding cylindric part 53, made in one piece with pedal 28. The ring can engage in any position so that the pedal is locked in the corresponding position. For the operation friction ring or hoop 52 is equipped with two arms 55, 56 (FIG. 3) and a bolt 57 extending freely through a hole in arm 55 and screwed into arm 56. Mounted around the bolt is a helical spring 58 pressing arm 55 towards arm 56, thereby clamping hoop 52 around part 53. The hoop or ring 52 may be spread out by two balls 59 which via a lever at clamping position engage in corresponding recesses 61 of arms 55, 56 and which are brought more or less far out of the recesses by said lever. The lever 60 has its one end journalled on axis 62 and its other end shaped as a ball 63, said ball engaging a recess 64 of a control slide valve 65. This valve is mounted slideably on casing 31' of the pedal control. The valve 49 in branch pipe 49' shown in FIG. 4 is normally closed. If opened the pressure falls in the piping system so that the pedal control 45 becomes ineffective. If the motor is to run with a determined number of revolutions this may be preset by the aid of the pedal control and regulated with valve 49 to be actuated either by hand or by foot.

The arrangement described for the compensation of hysteresis caused by friction and its combination with series of control and regulation devices so as to obtain an approach to the linearity of functions may, of course, be achieved in many different ways. The depicted arrangement represents only one of the embodiments of the invention possible. While in the present case the control device is equipped with a turn pedal, it could be constructed for a linear, straight motion as well. Also, the pressure operated regulating means, slide valve 15, can be replaced with a rotary slide valve or the like.

What I claim is:

1. A mechanism for regulating motors driven by a pressure medium, comprising a control device and regulating means, the control device being adapted to control the pressure of the pressure medium to the motor to provide for regulating movements of the regulating means to augment and reduce the number of revolutions of the motor, the regulating means comprising members causing friction against the regulating movements resulting in the requirement of a higher pressure of the pressure medium during increasing admission of pressure medium to the motor than during decreasing admission thereto, the control device including a friction coupling adapted to counteract said friction of the friction members of the regulating means.

2. A mechanism for regulating motors driven by a pressure medium, comprising regulating means responsive to the pressure of the pressure medium, a valve for regulating the pressure of the pressure medium, said valve including a valve body, a spring actuating said valve body and a lever for actuating the valve body by way of the spring, a friction coupling operable by the lever to actuate the valve together with said spring, whereby to counteract the tendency of a higher pressure of the pressure medium at increased admission to the regulating means via the valve and a lower pressure at decreased admission for one and the same position of the lever.

3. A control device for regulating mechanisms for motors driven by a pressure medium, comprising a valve for controlling the pressure of the pressure medium, said valve including a valve body and a seat, a lever rotatable about an axis for operation of the valve, a leaf spring, a cam adapted to be turned about said axis and formed with a curved surface, the leaf spring having its one end fixed to said curved surface, an abutment on the lever for the other end of said leaf spring, and a stop defining an initial position for the lever corresponding to a certain passage opening through the valve, the leaf spring extending between the cam and the abutment to contact the curved surface of the cam by an increasing portion of its length on a valve closing movement of the lever from said initial position, whereby the force required to move the valve body toward the valve seat by the lever is changed during the movemen of the lever in dependence upon the shape of the curved surface of the cam.

4. A control device as claimed in claim 3 and further comprising an arm attached to said cam and adapted to operate the valve body, an adjusting member mounted between said arm and said leaf spring for deflecting the leaf spring to an initial position out of contact with the abutment on the lever to render the initial movement of the lever from said stop ineffective for closing the valve and to cause an abrupt rise of the pressure controlled by the valve on continued movement of the lever in the closing direction.

5. A control device as claimed in claim 3 and further comprising an arm attached to said cam and adapted to operate the valve body, a set screw mounted in said arm for deflecting the leaf spring to an initial position out of contact with said abutment on the lever to render the initial movement of the lever from said stop ineffective for closing the valve, and a return spring for actuating said arm to release the control force exerted by the arm on the valve body.

6. A control device as claimed in claim 3 and further comprising an arm attached to said cam and adapted to operate the valve body, said arm being adjustable as to its angular position relatively to the lever with respect to the axis of rotation of the lever to enable variation of the initial position of the arm and lever.

7. A control device as claimed in claim 3 and further comprising an arm attached to the cam, said arm being operable to actuate the valve body on turning the cam about the axis of rotation of the lever, the lever being provided with a hub and the cam being rotatable on said hub, a friction disc mounted on the hub between the cam and the lever to enable the lever to turn the cam by way of the friction disc.

8. A control device as claimed in claim 3 and further comprising means for preselecting the number of revolutions of the motor by setting the position of the lever relatively to the casing of the control device.

References Cited

UNITED STATES PATENTS

| 1,105,841 | 8/1914 | Ricketts | 251—78 X |
| 1,673,954 | 6/1928 | Schmidt | 137—36 X |
| 2,157,652 | 5/1939 | Merriman | 137—37 X |
| 2,346,015 | 4/1944 | Eaton | 137—18 |
| 2,711,894 | 6/1955 | Knight | 137—36 X |
| 3,042,357 | 7/1962 | Engholdt | 251—78 |

CLARENCE R. GORDON, *Primary Examiner.*